United States Patent
Yoon

(10) Patent No.: US 9,021,764 B2
(45) Date of Patent: May 5, 2015

(54) APPARATUS FOR FIXING THE REAR GLASS OF AN OPERATOR CAB ON CONSTRUCTION MACHINERY

(75) Inventor: Chun-Jin Yoon, Changwon-si (KR)

(73) Assignee: Volvo Construction Equipment AB, Eskilstuna (SE)

( * ) Notice: Subject to any disclaimer, the term of this patent is extended or adjusted under 35 U.S.C. 154(b) by 0 days.

(21) Appl. No.: 13/812,182

(22) PCT Filed: Jul. 28, 2010

(86) PCT No.: PCT/KR2010/004946
§ 371 (c)(1),
(2), (4) Date: Jan. 25, 2013

(87) PCT Pub. No.: WO2012/015078
PCT Pub. Date: Feb. 2, 2012

(65) Prior Publication Data
US 2013/0125483 A1 May 23, 2013

(51) Int. Cl.
*E04C 2/54* (2006.01)
*E04F 13/02* (2006.01)
(Continued)

(52) U.S. Cl.
CPC . *E02F 9/16* (2013.01); *B60J 1/006* (2013.01); *E02F 9/163* (2013.01); *E02F 9/24* (2013.01); *B62D 25/04* (2013.01); *B66C 13/54* (2013.01); *B60J 1/1838* (2013.01)

(58) Field of Classification Search
CPC ........... E02F 9/16; B62D 25/04; B66C 13/54; E04C 2/54; E04F 13/02
USPC ......... 52/98, 100, 716.8, 716.5, 716.6, 716.1, 52/716.7, 716.3, 717.01, 717.02, 718.01, 52/208; 296/190.08
See application file for complete search history.

(56) References Cited

U.S. PATENT DOCUMENTS 3,808,742 A * 5/1974 Ehret et al. ............... 49/413
3,822,462 A * 7/1974 Chubb ..................... 29/416
(Continued)

FOREIGN PATENT DOCUMENTS

DE 19632610 A1 2/1998
GB 1300866 A 12/1972
(Continued)

OTHER PUBLICATIONS

International Search Report mailed Apr. 26, 2011 for PCT/KR2010/004946.
(Continued)

*Primary Examiner* — Phi A
(74) *Attorney, Agent, or Firm* — Lowe Hauptman & Ham, LLP

(57) ABSTRACT

An apparatus for fixing the rear glass of a cab on construction machinery is provided. The apparatus includes a window frame forming a cab window frame; a weather strip coupled to the window frame to seal a gap between the window frame and the rear glass of the cab; a glass interior fixing portion including an engagement portion inserted and engaged between the window frame and the weather strip, a body portion extending from the engagement portion at right angles and having a groove and a glass support portion supporting the rear glass of the cab; a glass exterior fixing portion engaged with the glass support portion of the glass interior fixing portion to support the rear glass of the cab; and a stopper having one side fixed to the window frame to support the rear glass of the cab.

2 Claims, 4 Drawing Sheets

(51) Int. Cl.
*E02F 9/16* (2006.01)
*B60J 1/00* (2006.01)
*E02F 9/24* (2006.01)
*B62D 25/04* (2006.01)
*B66C 13/54* (2006.01)
*B60J 1/18* (2006.01)

(56) References Cited

U.S. PATENT DOCUMENTS

| | | | | |
|---|---|---|---|---|
| 4,027,436 | A | * | 6/1977 | Daly ................................. 52/1 |
| 4,272,931 | A | * | 6/1981 | Stanizzo ........................ 52/98 |
| 4,656,793 | A | * | 4/1987 | Fons ............................... 52/98 |
| 5,950,370 | A | * | 9/1999 | Peck ............................... 52/35 |
| 6,088,979 | A | * | 7/2000 | Neal ............................. 52/212 |
| 6,973,754 | B2 | * | 12/2005 | Iguchi et al. ................... 52/208 |
| 7,299,597 | B2 | * | 11/2007 | Holt ............................... 52/712 |
| 8,146,315 | B2 | * | 4/2012 | Ruhlmann et al. ......... 52/506.06 |

FOREIGN PATENT DOCUMENTS

| | | |
|---|---|---|
| JP | 05-010676 | 2/1993 |
| KR | 20-1995-0024782 | 9/1995 |
| KR | 20-1995-0032657 | 12/1995 |
| KR | 20-1998-013853 | 6/1998 |
| KR | 20-0140800 | 4/1999 |

OTHER PUBLICATIONS

Written Opinion of ISA mailed Apr. 26, 2011 for PCT/KR2010/004946.
International Preliminary Report on Patentability (PCT/IPEA/409) dated Nov. 26, 2012 for PCT/KR2010/004946.
China Office Action of CN 201080068254.7 mailed Sep. 2, 2014.

* cited by examiner (a)　　　　　　　(b)

APPARATUS FOR FIXING THE REAR GLASS OF AN OPERATOR CAB ON CONSTRUCTION MACHINERY

TECHNICAL FIELD

The present invention relates to an apparatus for fixing the rear glass of a cab on construction machinery. More particularly, the present invention relates to an apparatus for fixing a rear glass of a cab on construction machinery, which allows for easy detachment of the glass in the event of an emergency escape, and thus enables an operator in the cab to easily escape from the cab when an emergency situation occurs.

BACKGROUND ART

If an accident, such as overturn of construction equipment, occurs in a construction spot, an operator breaks a rear glass of a cab to escape from the cab. Conventionally, in order to escape through the rear glass, the operator breaks the rear glass of the cab using a hammer for an emergency escape that is put on a hammer hanger, removes pieces of broken glass, and then escapes through the broken glass window. FIG. 1 is a perspective view illustrating a cab 2 and a hammer 1 for an emergency escape put on a side surface of a rear glass of the cab 2 in the related art. However, the hammer 1 for an emergency escape may be lost, and even if the hammer 1 is used, it is not easy to break the rear glass, and this causes difficulty in escaping rapidly. Further, the operator may be injured with the pieces of the rear glass broken by the hammer 1.

FIG. 2 is a perspective view illustrating a fixing device in the related art that fixes a rear glass 3 of a cab 2 using a seal 5. In the case of fixing the rear glass using the seal 5, a special tool is used to cause large expenses, and an operator is unable to directly replace the rear glass. The reference numeral "4" denotes a decal that indicates an emergency escape.

FIG. 3 is a perspective view illustrating a fixing device in the related art that fixes a rear glass 3 of a cab 2 using glue 6. In the case of reattaching the broken rear glass using the glue 6, it takes time to dry the glue 6 that fixes the rear glass, and thus the construction equipment is unable to operate immediately. Particularly, in the winter season or cold weather, it is much more difficult to replace the rear glass.

DISCLOSURE

Technical Problem

Therefore, the present invention has been made to solve the above-mentioned problems occurring in the related art, and one embodiment of the present invention is related to an apparatus for fixing a rear glass of a cab on construction machinery, which allows for easy detachment of the glass without using a separate hammer for an emergency escape to enable an operator to rapidly escape from the cab when an emergency situation occurs, and which enables the operator to directly replace the rear glass to save rear glass replacement costs and time.

Technical Solution

In accordance with an aspect of the present invention, there is provided an apparatus for fixing the rear glass of a cab on construction machinery that allows for easy detachment of the glass in the event of an emergency escape, which includes a window frame forming a cab window frame; a weather strip coupled to the window frame to seal a gap between the window frame and the rear glass of the cab; a glass interior fixing portion including an engagement portion inserted and engaged between the window frame and the weather strip, a body portion extending from the engagement portion at right angles and having a groove so that the body portion can be broken by an external impact, and a glass support portion supporting the rear glass of the cab; a glass exterior fixing portion engaged with the glass support portion of the glass interior fixing portion to support the rear glass of the cab; and a stopper having one side fixed to the window frame to support the rear glass of the cab.

It is preferable that the groove provided in the body portion of the glass interior fixing portion has a "V"-shaped cross-section.

The glass support portion of the glass interior fixing portion may have an engagement hole and may be engaged with the glass exterior fixing portion.

The stopper may include a main body portion supporting the rear glass of the cab, a main body support portion extending from the main body portion at right angles and fixed to one side of the window frame, and a glass seat portion which is formed inside the main body support portion and on which the rear glass of the cab is seated.

Advantageous Effect

According to an embodiment of the present invention as described above, the rear glass can be easily taken away without using the separate hammer for an emergency escape to enable the operator to rapidly escape from the cab when an emergency situation occurs, and the operator can directly replace the rear glass to save the rear glass replacement costs and time.

Further, even in the case where the operator breaks the rear glass using the hammer to escape from the cab, the operator can be prevented from being injured with the pieces of the broken rear glass. Further, it is possible to immediately replace the rear glass regardless of the seasons or places, and thus the construction equipment is able to operate immediately after the replacement.

BRIEF DESCRIPTION OF THE DRAWINGS

The above objects, other features and advantages of the present invention will become more apparent by describing the preferred embodiments thereof with reference to the accompanying drawings, in which.

BEST MODE

Hereinafter, a preferred embodiment of the present invention will be described in detail with reference to the accompanying drawings.

Figure 1:
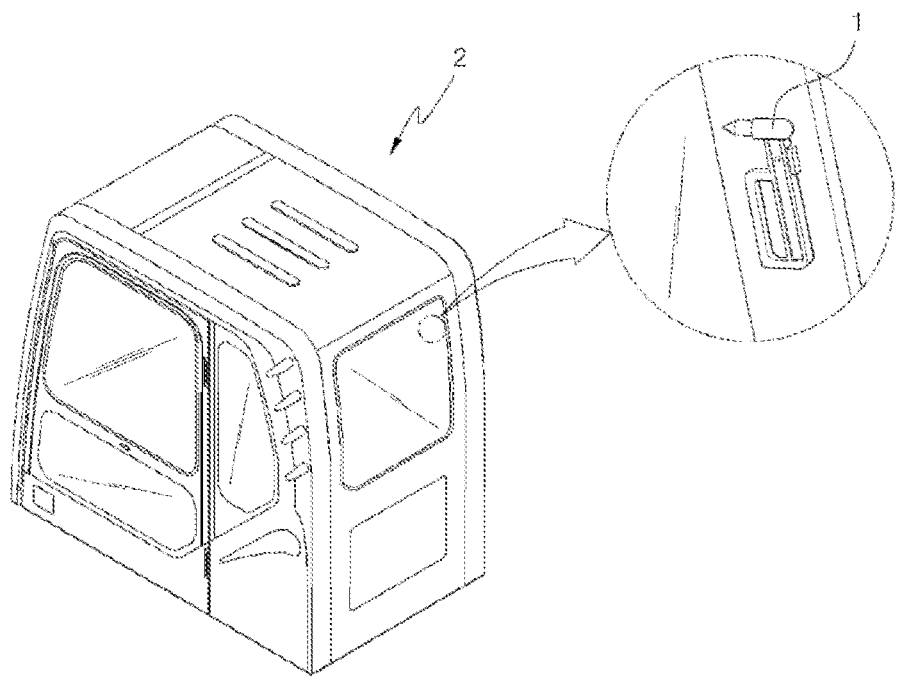
FIG. 1 is a perspective view illustrating a cab and a hammer for an emergency escape.
Figure 2:
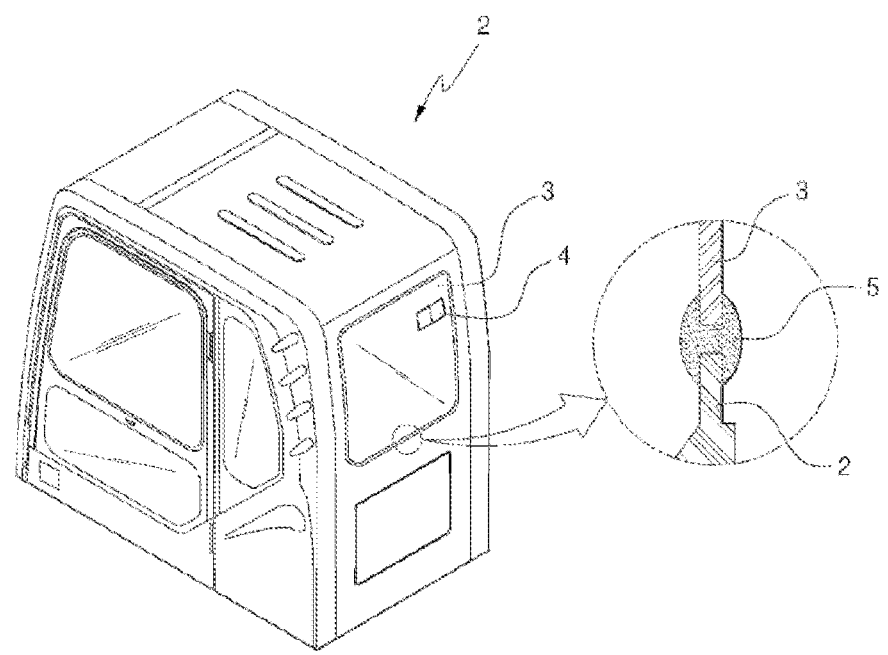
FIG. 2 is a perspective view illustrating a cap rear glass in the related art fixed using a seal.
Figure 3:
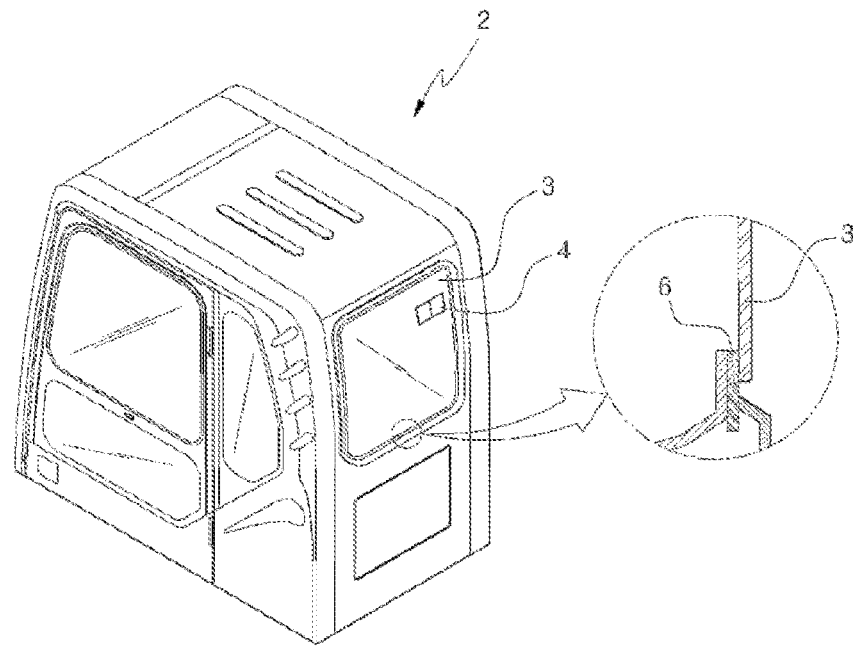
FIG. 3 is a perspective view illustrating a rear glass of a cab in the related art fixed using glue.
Figure 4:
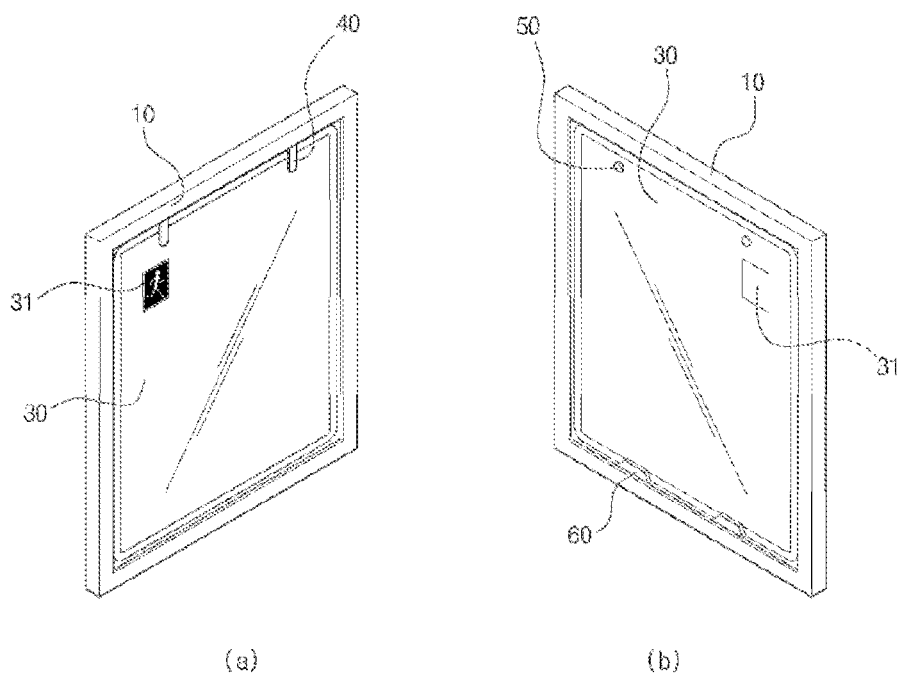
FIGS. 4(a) and 4(b) are perspective views illustrating an apparatus for fixing a rear glass of a cab mounted according to an embodiment of the present invention as seen from an inside of the cab and as seen from an outside of the cab.

FIGS. 4(a) and 4(b) are perspective views illustrating an apparatus for fixing a rear glass of a cab mounted according to an embodiment of the present invention as seen from an inside of the cab and as seen from an outside of the cab. Referring to FIG. 4(a), a decal 31 is attached to a rear glass 30 in a cab to indicate that an emergency escape is possible. Further, a glass interior fixing portion 40 is engaged with a window frame 10 to support the rear glass 30. Referring to FIG. 4(b), a window frame 10, a glass exterior fixing portion 50, and a stopper 60 are provided on the outside of the cab.

Figure 5:
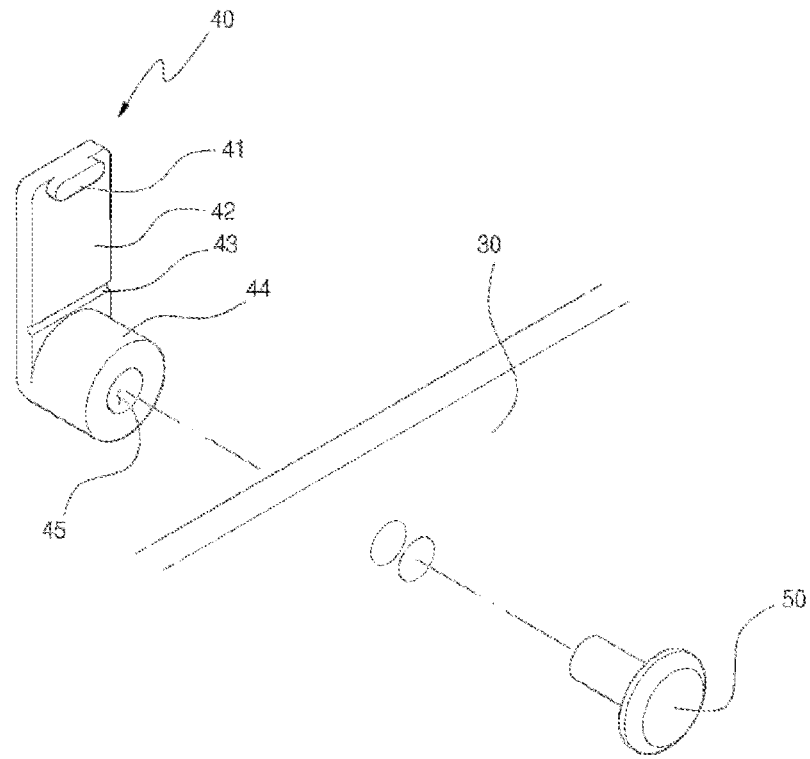
FIG. 5 is a perspective view illustrating a glass interior fixing portion and a glass exterior fixing portion of a rear glass of a cab according to the present invention.

FIG. 5 is a perspective view illustrating a glass interior fixing portion 40 and the glass exterior fixing portion 50 of the rear glass of the cab according to the present invention. Referring to FIG. 5, the glass interior fixing portion 40 may include an engagement portion 41 inserted and engaged in a space between the window frame 10 and the weather strip 20, a body portion 42 extending from the engagement portion at right angles and having a groove 41 so that the body portion can be broken by an external impact, and a glass support portion 44 supporting the rear glass 30 of the cab.

If an impact is applied from the outside to the glass interior fixing portion 40, the portion of the groove 43, which is weak against the impact, is easily broken. If the portion of the groove 43 is broken due to the external impact applied to the body portion 42 of the glass interior fixing portion 40, the rear glass 30 can be easily taken away when an emergency situation occurs. The glass support portion 44 has an engagement hole 45 formed therein, and is engaged with the glass exterior fixing portion 50.

The rear glass 30 can be fixed using the glass interior fixing portion 40 and the glass exterior fixing portion 50. The glass exterior fixing portion 50 is engaged with the engagement hole 45 of the glass interior fixing portion 40, and the engagement portion 41 of the glass interior fixing portion 40 is engaged between the window frame 10 and the weather strip 20, so that the glass support portion 44 can support the rear glass 30 of the cab.

The glass exterior fixing portion 50 can be engaged in the engagement hole 45 of the glass interior fixing portion 40 as a bolt and a nut. That is, a screw thread may be formed inside the engagement hole 45 of the glass interior fixing portion 40, and by turning the glass exterior fixing portion 50, the glass exterior fixing portion 50 may be screw-engaged in the engagement hole 45 of the glass interior fixing portion 40.

Figure 6:
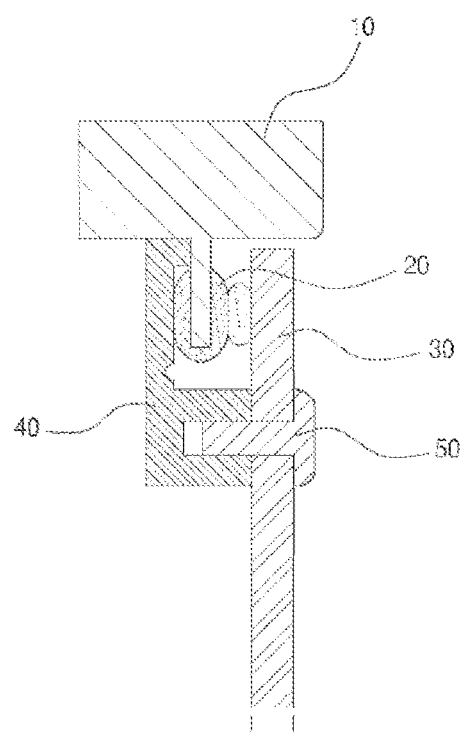
FIG. 6 is a cross-sectional view illustrating a rear glass fixed using the apparatus for fixing the rear glass.

FIG. 6 is a cross-sectional view illustrating the rear glass fixed using the apparatus for fixing the rear glass. The glass exterior fixing portion 50 is engaged in the engagement hole 45 of the glass interior fixing portion 40, and the engagement portion 41 of the glass interior fixing portion 40 is engaged between the window frame 10 and the weather strip 20, so that the glass support portion 44 can support the rear glass 30 of the cab.

Figure 7:
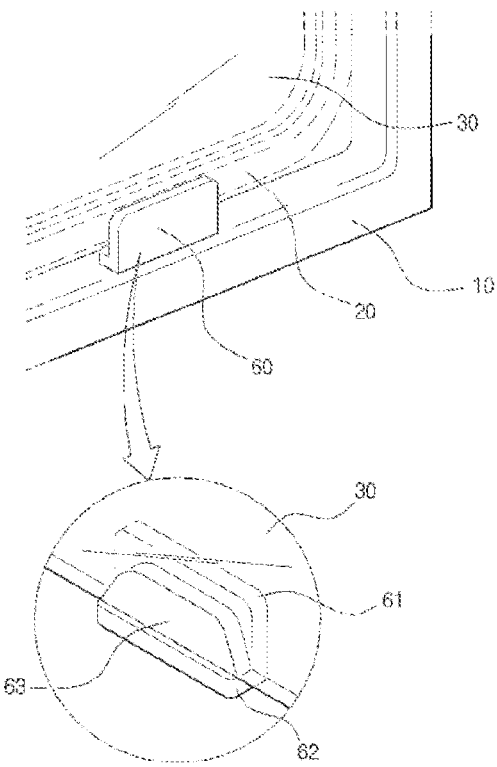
FIG. 7 is a perspective view illustrating a rear glass of a cab on which a stopper is mounted.

FIG. 7 is a perspective view illustrating the rear glass 30 of the cab on which a stopper is mounted. Referring to FIG. 7, the stopper 60 is engaged with the window frame 10, and as shown in an enlarged view of the stopper 60 and the rear glass 30 that is seated on the stopper 60, the stopper 60 may include a main body portion 61 supporting the rear glass 30 of the cab, a main body support portion 62 extending from the main body portion at right angles and fixed to one side of the window frame 10, and a glass seat portion 63 formed inside the main body support portion 62. The rear glass 30 may be seated on the glass seat portion 63.

Figure 8:
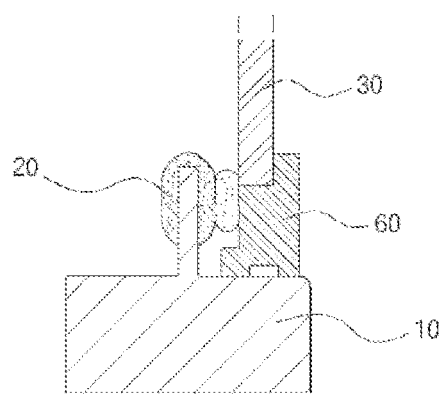
FIG. 8 is a cross-sectional view of a rear glass on which a stopper is mounted.

FIG. 8 is a cross-sectional view of the rear glass 30 seated between the stopper 60 and the weather strip 20. Since the stopper 60 supports the rear glass 30, it functions to prevent the rear glass 30 from being pushed to the outside.

Although preferred embodiments of the present invention have been described for illustrative purposes, the present invention is not limited to the above-described specific embodiments, and those of ordinary skill in the art to which the present invention pertains will appreciate various changed in form and detail may be made therein without departing from the spirit and scope of the invention as defined by the appended claims. Further, the items that can be easily analogized from the accompanying drawings, although not described in the detailed description, should be considered to be included in the contents of the present invention, and various modified embodiments should not be understood separately from the technical idea or prospect of the present invention.

The invention claimed is:

1. An apparatus for fixing a rear glass of a cab of a construction machinery, the apparatus comprising:
   a cab window frame;
   a weather strip coupled to the cab window frame, and configured to seal a gap between the cab window frame and the rear glass;
   a first glass fixing portion configured to be disposed inside the rear glass, and comprising:
      an engagement portion to be inserted and engaged between the cab window frame and the weather strip;
      a body portion extending from the engagement portion at a right angle and having a groove configured to be broken by an external impact; and
      a glass support portion configured to support the rear glass;
   a second glass fixing portion configured to be disposed outside the rear glass, to be engaged with the glass support portion, and to support an upper portion of the rear glass; and
   a stopper comprising:
      a main body portion configured to support a lower portion of the rear glass from the outside the rear glass;
      a main body support portion extending from the main body portion at a right angle, and configured to be fixed to one side of the cab window frame; and
      a glass seat portion formed on the main body support portion, and configured to support a bottom portion of the rear glass which is seated on the glass seat portion,
   wherein the glass support portion comprises an engagement hole which is configured to be engaged with the second glass fixing portion.

2. The apparatus according to claim 1, wherein the groove has a "V"-shaped cross-section.

* * * * *